United States Patent
Valdez Balderas et al.

(10) Patent No.: US 12,033,297 B2
(45) Date of Patent: Jul. 9, 2024

(54) METHOD AND SYSTEM FOR IMAGE RETARGETING

(71) Applicant: SAMSUNG ELECTRONICS CO., LTD., Suwon-si (KR)

(72) Inventors: Daniel Valdez Balderas, Staines (GB); Oleg Muraveynyk, Staines (GB); Timothy Smith, Staines (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 94 days.

(21) Appl. No.: 17/879,167

(22) Filed: Aug. 2, 2022

(65) Prior Publication Data

US 2022/0383448 A1    Dec. 1, 2022

Related U.S. Application Data

(63) Continuation of application No. PCT/KR2021/018967, filed on Dec. 14, 2021.

(30) Foreign Application Priority Data

Jan. 11, 2021  (GB) ..................................... 2100316
Jun. 17, 2021  (GB) ..................................... 2108647

(51) Int. Cl.
*G06T 3/04*     (2024.01)
*G06T 3/4046*   (2024.01)
(Continued)

(52) U.S. Cl.
CPC .............. *G06T 3/04* (2024.01); *G06T 3/4046* (2013.01); *G06T 7/11* (2017.01); *G06T 11/00* (2013.01);
(Continued)

(58) Field of Classification Search
CPC .................................................. G06T 3/0012
See application file for complete search history.

(56) References Cited

U.S. PATENT DOCUMENTS 7,574,069 B2    8/2009    Setlur et al.
8,494,302 B2    7/2013    Ding et al.
(Continued)

FOREIGN PATENT DOCUMENTS

JP    2013-84202 A      5/2013
KR    10-0988380 B1    10/2010
(Continued)

OTHER PUBLICATIONS

International Search Report dated Mar. 17, 2022 issued by the International Searching Authority in counterpart International Application No. PCT/KR2021/018967 (PCT/ISA/210).
(Continued)

*Primary Examiner* — Shivang I Patel
(74) *Attorney, Agent, or Firm* — Sughrue Mion, PLLC (57) ABSTRACT

A method of image retargeting is provided. The method includes obtaining a source image, obtaining a target size for a retargeted image based on the source image, generating a two-dimensional importance map for the source image, generating, based on the two-dimensional importance map and the target size, a warping mesh having a distortion metric below a threshold value, determining whether a size of the warping mesh corresponds to the target size, and based on the size of the warping mesh being determined to correspond to the target size, rendering the retargeted image by applying the warping mesh to the source image.

15 Claims, 8 Drawing Sheets

(51) Int. Cl.
　　　*G06T 7/11* 　　　(2017.01)
　　　*G06T 11/00* 　　(2006.01)
(52) U.S. Cl.
　　　CPC .............. *G06T 2207/20084* (2013.01); *G06T 2207/20132* (2013.01); *G06T 2210/22* (2013.01); *G06T 2210/44* (2013.01)

(56) References Cited

U.S. PATENT DOCUMENTS

| | | | |
|---|---|---|---|
| 9,202,258 | B2 | 12/2015 | Greisen et al. |
| 9,330,434 | B1 | 5/2016 | Gross et al. |
| 9,443,283 | B2 | 9/2016 | Sohn et al. |
| 2007/0025637 | A1 | 2/2007 | Setlur et al. |
| 2011/0279641 | A1* | 11/2011 | Wang ................... G06T 7/215 348/E13.001 |
| 2012/0121204 | A1* | 5/2012 | Ding ................... G06T 3/0012 382/260 |
| 2015/0371367 | A1 | 12/2015 | Wang et al. |
| 2020/0218961 | A1* | 7/2020 | Kanazawa ............ H04L 12/40 |

FOREIGN PATENT DOCUMENTS

| | | |
|---|---|---|
| KR | 10-1511907 B1 | 4/2015 |
| KR | 10-2019-0069893 A | 6/2019 |
| KR | 10-2051597 B1 | 12/2019 |
| WO | 2020/101434 A1 | 5/2020 |

OTHER PUBLICATIONS

International Written Opinion dated Mar. 17, 2022 issued by the International Searching Authority in counterpart International Application No. PCT/KR2021/018967 (PCT/ISA/237).

Tianli Liao et al., "Single-Perspective Warps in Natural Image Stitching", arXiv:1802.04645v2, Mar. 2018, 10 pages total.

Yinzuo Zhou et al., "Perceptually Aware Image Retargeting for Mobile Devices", IEEE Transactions on Image Processing, vol. 27, No. 5, Digital Object Identifier 10.1109/TIP.2017.2779272, 2017, 13 pages total.

Daniele Panozzo et al., "Robust Image Retargeting via Axis-Aligned Deformation", Eurographics, Computer Graphics Forum, vol. 31, No. 2, 2011, 8 pages total.

Yuanyuan Ding et al., "Importance Filtering for Image Retargeting", Proceedings / CVPR, IEEE Computer Society Conference on Computer Vision and Pattern Recognition, DOI: 10.1109/CVPR.2011.5995445, Jun. 2011, 9 pages total.

Chun Pong Lau et al., "Image Retargeting via Beltrami Representation", IEEE Transactions on Image Processing, vol. 27, No. 12, 2018, Digital Object Identifier 10.1109/TIP.2018.2858146, 15 pages total.

Communication dated Dec. 1, 2021 issued by the Great Britain Intellectual Property Office in counterpart Great Britain Application No. GB2108647.5.

Liang-Chieh Chen et al., "Encoder-Decoder with Atrous Separable Convolution for Semantic Image Segmentation", arXiv:1802.02611v3, 2018, 18 pages total.

Alexander Kroner et al., "Contextual encoder-decoder network for visual saliency prediction", Neural Networks, 129, 2020, 10 pages total.

Daniele Panozzo et al., "Robust Image Retargeting via Axis-Aligned Deformation", Computer Graphics Forum, Eurographics, vol. 31, No. 2, 2012, 8 pages total.

Shai Avidan et al., "Seam Carving for Content-Aware Image Resizing", ACM Transactions on Graphics, vol. 26, No. 3, Article 10, Jul. 2007, DOI 10.1145/1239451.1239461, 10 pages total.

Weimin Tan et al., "Cycle-IR: Deep Cyclic Image Retargeting", arXiv:1905.03556v1, May 2019, 12 pages total.

Philipp Krähenbühl et al., "A System for Retargeting of Streaming Video", Blender Foundation & Mammoth HD, 2009, 10 pages total.

Jun-Seong Kim et al., "Adaptive Image and Video Retargeting Technique Based on Fourier Analysis", IEEE, 2009, 8 pages total.

Dahun Kim et al., "Deep Video Inpainting", arXiv:1905.01639v1, May 2019, 10 pages total.

Fan Tang et al., "Image Retargetability", arXiv:1802.04392v2, IEEE Transactions on Multimedia, Aug. 2019, 13 pages total.

Jianxin Lin et al., "DeepIR: A Deep Semantics Driven Framework for Image Retargeting", arXiv:1811.07793v3, Jul. 2019, 9 pages total.

Michael Rubinstein et al., "Improved Seam Carving for Video Retargeting", ACM SIGGRAPH conference proceedings, 2008, 9 pages total.

Donghyeon Cho et al., "Weakly- and Self-Supervised Learning for Content-Aware Deep Image Retargeting", arXiv:1708.02731v1, Aug. 2017, 10 pages total.

Liang-Chieh Chen et al., "Rethinking Atrous Convolution for Semantic Image Segmentation", arXiv:1706.05587v3, Dec. 2017, 14 pages total.

Michael Rubinstein et al., "A Comparative Study of Image Retargeting", ACM Transactions on Graphics, 2010, 10 pages total.

Nobukatsu Kajiura et al., "Self-Play Reinforcement Learning for Fast Image Retargeting", Proceedings of the 28th ACM International Conference on Multimedia, arXiv:2010.00909v1, Oct. 2020, 9 pages total.

Moab Arar et al., "Image Resizing by Reconstruction from Deep Features", arXiv:1904.08475v1, Apr. 2019, 13 pages total.

Mahdi Ahmadi et al., "Context-Aware Saliency Detection for Image Retargeting Using Convolutional Neural Networks", 2019, 20 pages total.

\* cited by examiner

METHOD AND SYSTEM FOR IMAGE RETARGETING

CROSS-REFERENCE TO RELATED APPLICATION(S)

This application is a bypass continuation of International Application No. PCT/KR2021/018967, filed on Dec. 14, 2021, in the Korean Intellectual Property Receiving Office, which is based on and claims priority to GB Patent Application No. 2108647.5, filed on Jun. 17, 2021 and GB Patent Application No. 2100316.5, filed on Jan. 11, 2021, the disclosures of which are incorporated by reference herein in their entireties.

BACKGROUND

1. Field

The disclosure relates generally to image retargeting.

2. Description of Related Art

Image retargeting changes the aspect ratio of images while aiming to preserve important content and minimize noticeable distortion. Techniques for fast, high-quality retargeting are particularly relevant due to the large variety of image and display aspect ratios. The use of visual media on mobile devices has seen dramatic increases o. Devices have a large variety of display aspect ratios (e.g., phones, smart watches, tablets, TVs, etc.) and some devices can dynamically change the aspect ratio (e.g., foldable and rollable phones).

Further, different camera sensors capture a variety of different aspect ratios and sharing images across devices is a strong trend in social media. This multiplicity of media and display sizes makes retargeting a highly relevant technology. In the era of mobile computing, fast and light-weight retargeting methods, which allow real-time, interactive usage on mobile devices are particularly desirable.

Problems can arise because the image aspect ratio often does not match the display aspect ratio, which means that screen space is wasted or images are smaller and harder to appreciate. Traditional approaches to image retargeting have been categorized as either discrete or continuous. Discrete approaches, such as seam carving, add or remove pixels in order to achieve the final size. Continuous methods, on the other hand, change the dimensions by finding a mapping (e.g., a warp) from source to target. More recently, a variety of retargeting algorithms based on deep neural networks (DNNs) and reinforcement learning have also been proposed.

SUMMARY

Provided is a light-weight image retargeting solution that is executable on mobile devices. Also provided is a retargeting method that combines the use of existing deep neural networks (DNNs) and a warping algorithm, and a novel way to quantify and limit warping distortions via content-aware cropping. By combining the capabilities of existing DNN architectures with the efficiency of a warping algorithm, embodiments of the disclosure may provide a beneficial method of image retargeting.

Additional aspects will be set forth in part in the description which follows and, in part, will be apparent from the description, or may be learned by practice of the presented embodiments.

According to an aspect of the disclosure, a method of image retargeting may include obtaining a source image, obtaining a target size for a retargeted image based on the source image, generating a two-dimensional importance map for the source image, generating, based on the two-dimensional importance map and the target size, a warping mesh having a distortion metric below a threshold value, determining whether a size of the warping mesh corresponds to the target size, based on the size of the warping mesh being determined to correspond to the target size, rendering the retargeted image by applying the warping mesh to the source image, and based on the size of the warping mesh being determined to not correspond to the target size, generating, based on the warping mesh, a cropped warping mesh including at least one cropped region, and applying the cropped warping mesh to the source image to render the retargeted image.

The distortion metric may include a measure of an average change in an aspect ratio of a plurality of cells of the warping mesh across the source image weighted by a size and importance of each of the plurality of cells.

The threshold value may include a tunable parameter $D_t$ that regulates proportions of warping and cropping of the warping mesh.

The warping mesh may be generated such that a height and/or a width of the source image is warped to a maximum value with the distortion metric below the threshold value.

The method may further include using an iterative process to determine the maximum value using the distortion metric D by finding a root $S_{int}$ of a function of $D(S_{int})-D_t=0$, where the distortion metric D is determined according to:

$$D = \frac{1}{A}\sum_{i=1}^{N}\left[\frac{\max(h'_i, w'_i)}{\min(h'_i, w'_i)} - 1\right] \cdot h_i \cdot w_i \cdot (\Omega_i + \Omega_0).$$

where A is a total area of the warping mesh; $h_i$ and $w_i$ are a non-normalized height and width, respectively, of cells in the warping mesh, $h_i'$ and $w_i'$ are a normalized height and width, respectively, of cells in the warping mesh; N is a number of cells in the warping mesh; $\Omega_i$ is an average importance over pixels of an $i^{th}$ cell of the warping mesh, and $\Omega_0$ is a tunable parameter to penalize distortion of non-important cells in the warping mesh.

The cropped warping mesh may generated by distributing cropping to left and/or right side edges, and/or top and/or bottom edges, of the warping mesh to reduce removal of important regions of the source image.

Generating the cropped warping mesh may include generating a one-dimensional version of the two-dimensional importance map, determining at least one region to crop based on the one-dimensional version of the two-dimensional importance map, producing a warped one-dimensional warping mesh by, applying one-dimensional warping to the one-dimensional version of the two-dimensional importance map and cropping the determined at least one region from the one-dimensional version of the two-dimensional importance map, and generating the cropped warping mesh based on the warped one-dimensional version warping mesh.

The method may further include adding importance factors to the one-dimensional version of the two-dimensional importance map to bias the cropping towards specific regions.

The importance factors may be based on a function set to near zero at side and/or top/bottom edges of the two-dimensional importance map, the function may increase towards a pre-defined section of the source image, and the pre-defined section of the source image is selected from a set including an image center; a distance of about two-thirds of a total width of the source image; and a center of mass of the two-dimensional importance map.

The method may further include detecting a configuration change event to initiate the generating of the two-dimensional importance map for the source image.

The two-dimensional importance map may be generated using deep neural network (DNN)-based semantic segmentation and saliency detection.

The method may include generating the two-dimensional importance map as a pre-processing step independently of the step of obtaining the target size.

The source image may include a background on a display of a mobile device.

According to an aspect of the disclosure, a device for image retargeting may include a memory storing instructions and a processor configured to execute the instructions to obtain a source image, obtain a target size for a retargeted image based on the source image, generate a two-dimensional importance map for the source image, generate, based on the two-dimensional importance map and the target size, a warping mesh having a distortion metric below a threshold value, determine whether a size of the warping mesh corresponds to the target size, based on the size of the warping mesh being determined to correspond to the target size, render the retargeted image by applying the warping mesh to the source image, and based on the size of the warping mesh being determined to not correspond to the target size, generate, based on the warping mesh, a cropped warping mesh including at least one cropped region and apply the cropped warping mesh to the source image to render the retargeted image.

According to an aspect of the disclosure, a non-transitory, computer-readable medium connected with one or more processors may store instructions that, when executed by the one or more processors, cause the one or more processors to obtain a source image, obtain a target size for a retargeted image based on the source image, generate a two-dimensional importance map for the source image, generate, based on the two-dimensional importance map and the target size, a warping mesh having a distortion metric below a threshold value, determine whether a size of the warping mesh corresponds to the target size, based on the size of the warping mesh being determined to correspond to the target size, render the retargeted image by applying the warping mesh to the source image, and based on the size of the warping mesh being determined to not correspond to the target size, generate, based on the warping mesh, a cropped warping mesh including at least one cropped region and apply the cropped warping mesh to the source image to render the retargeted image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
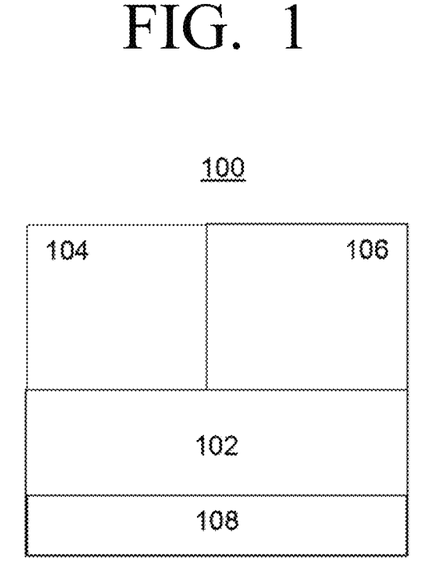
FIG. 1 is a diagram of a computing device according to an embodiment.

FIG. 1 is a diagram of a computing device 100 according to an embodiment. The device will normally include, or be associated with, at least one processor 102, memory 104 and communications interface 106. Examples of computing devices include desktop personal computers, servers, as well as mobile computing devices such as mobile telephones/smartphones and tablet computers, which are of particular interest in many embodiments of the invention. The device may also include a user interface component 108, such as a touchscreen. Other components and features of the device will be well-known to the skilled person and need not be described herein in detail.

Figure 2:
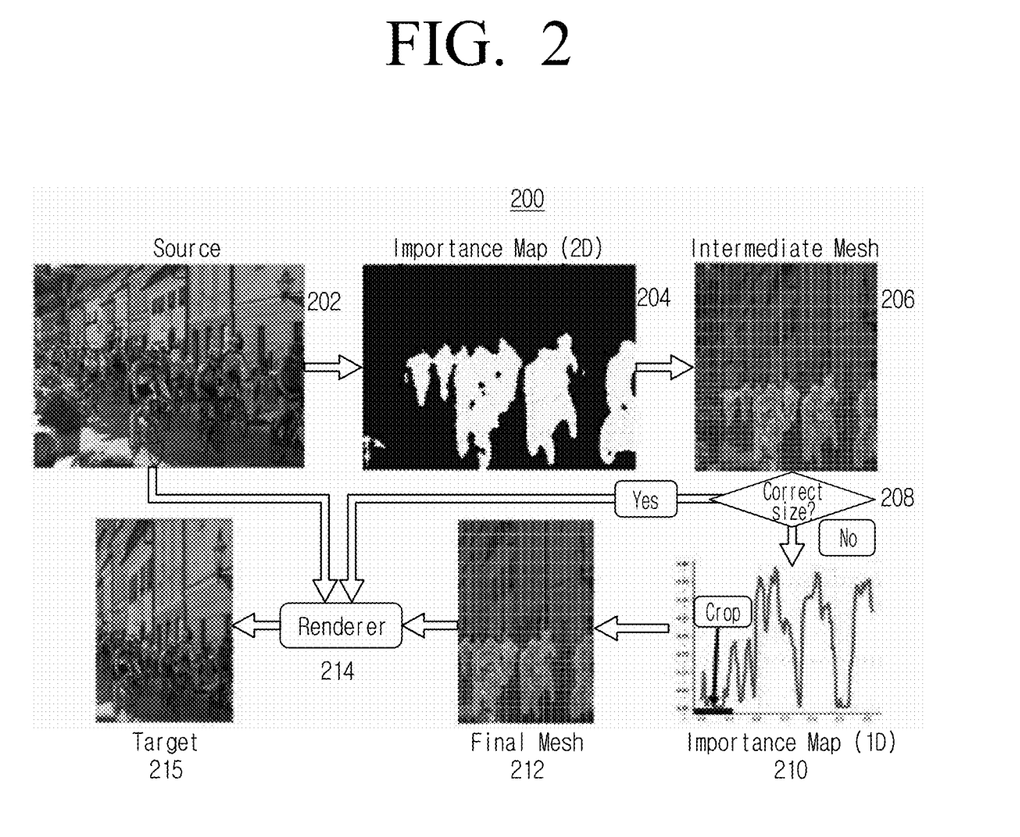
FIG. 2 is a flowchart for a method of image retargeting according to an embodiment.

FIG. 2 is a flowchart of a method 200 according to an embodiment and shows steps performed by software instructions being executed by the computing device 100. It will be appreciated that at least one of the steps shown in the figures herein may be re-ordered or omitted. One or more additional steps may be performed in some cases. Further, although the steps are shown as being performed in sequence in the Figures, in alternative embodiments some of them may be performed concurrently, possibly on different processors or cores. It will also be understood that embodiments may be implemented using any suitable software, programming language, data editors, etc., and may be represented/stored/processed using any suitable data structures and formats.

The method 200 may be implemented in various ways. For example, it may be initiated by opening a stand-alone image retargeting application that allows a user to directly select a source image from a gallery or the like and enter retargeting details, such as the target size. Alternatively, the method may be triggered by an instruction from another application or operating system, such as upon detection of rotation of a mobile device's screen, resulting in automatic retargeting of an onscreen image (e.g., wallpaper) to a target size based on stored data. To give an example, in a Foldable phone such as the Samsung Fold 2™, the retargeting process may be triggered by a system screen size change event, (e.g., when the foldable phone is folded and the system has to use a smaller screen (i.e., the screen aspect ratio changes)).

Embodiments of the method may include, for example, five stages: (1) importance map generation, (2) (intermediate/preliminary) warping mesh generation, (3) determination of cropping regions, if any, (4) generation of final warping-cropping mesh, and (5) final rendering. The importance map may be produced with the use of semantic segmentation and saliency detection, for example. This map is then used as input to an algorithm such as Axis Aligned Deformation (AAD) in order to produce a warping mesh. It will be understood that any other algorithm that does not restrict mesh deformations to axis aligned deformations could be used, such as including rotations and non-axis aligned scaling's in the warping mesh. If this warping mesh matches the target image size, then it is used to produce the retargeted image when rendering and the method stops. However, if the size of the warping mesh does not match the target size, then content-aware cropping may be performed, typically using a one dimensional version of the importance map.

In more detail with reference to FIG. 2, in operation 202, the system may receive input data. Typically, this data may include a source image and an indication of the desired target size for the retargeted image. The target size may be represented in various ways (e.g. corresponding to a common image or screen ratio (e.g. 9:16, 4:5, 1:1 or 16:19)) based on data stored in a device, or it may be based on user-defined dimensions.

In operation 204, the system may generate a two-dimensional importance map for the source image. The importance map quantifies the relevance of each pixel, where the higher the average importance over an image region, the lower the warping distortions, and the more unlikely the region will be cropped out by the retargeting process. The importance map may be generated using artificial intelligences (AI)-based or non-AI based techniques. Examples of suitable techniques can include semantic segmentation, saliency detection, and conditional random fields, including DNN-based semantic segmentation, and saliency detection. Other neural networks, for example, DeepLab v3, suitable for mobile deployment may be used in alternative embodiments. In some embodiments, the importance map is generated using a combination of existing DNN-based semantic segmentation and saliency detection. Specifically, the source image may be first put through a segmentator and a test for significant detections is performed. If the percentage of pixels detected as non-background objects is greater than a certain threshold, then the algorithm may assign an importance of to pixels with detections or 0 otherwise. However, if the percent of detections is les than the threshold then the source image is put through a Saliency Detector and the saliency score may be used as the importance.

The following AI models in Table 1 may be suitable examples for both desktop and mobile on-device execution (only on-device timings are given below):

Given the two dimensional (2D) importance map and the target size, $S_{tar}$, the system may compute the warping mesh (e.g., using an optimizer). The mesh may be associated with an intermediate image size, $S_{int}$, such that if the mesh is applied to the source image via a renderer, an image of size $S_{int}$ is produced. The system may automatically quantify and limit warping distortions and typically aim to produce a warp of size of $S_{int}=S_{tar}$, and may produce a different (intermediate) warp size of $S_{int} \neq S_{tar}$. The system may therefore address the technical problem of automatically evaluating the effect of warping before producing the final retargeted image.

The system may use a tunable parameter $D_t$ that regulates the proportion of warping and cropping, and hence the level of distortion in retargeted images produced using the mesh. The value of $D_t$ may be set by a developer following tests (e.g., based on particular types of images). This can overcome the technical problem of a user having to manually set a preference to carry out only warping, only cropping, or a combination of the two, and allows tuning by a continuous parameter between 0 and infinity (or 1). In some embodiments, $D_t$ may be set to any floating point value between 0 and infinity (or 1), where Dt=0 may indicate warping only (no cropping), Dt=1 indicates only cropping (no warping), and values in between set the proportion of warping.

Figure 3:
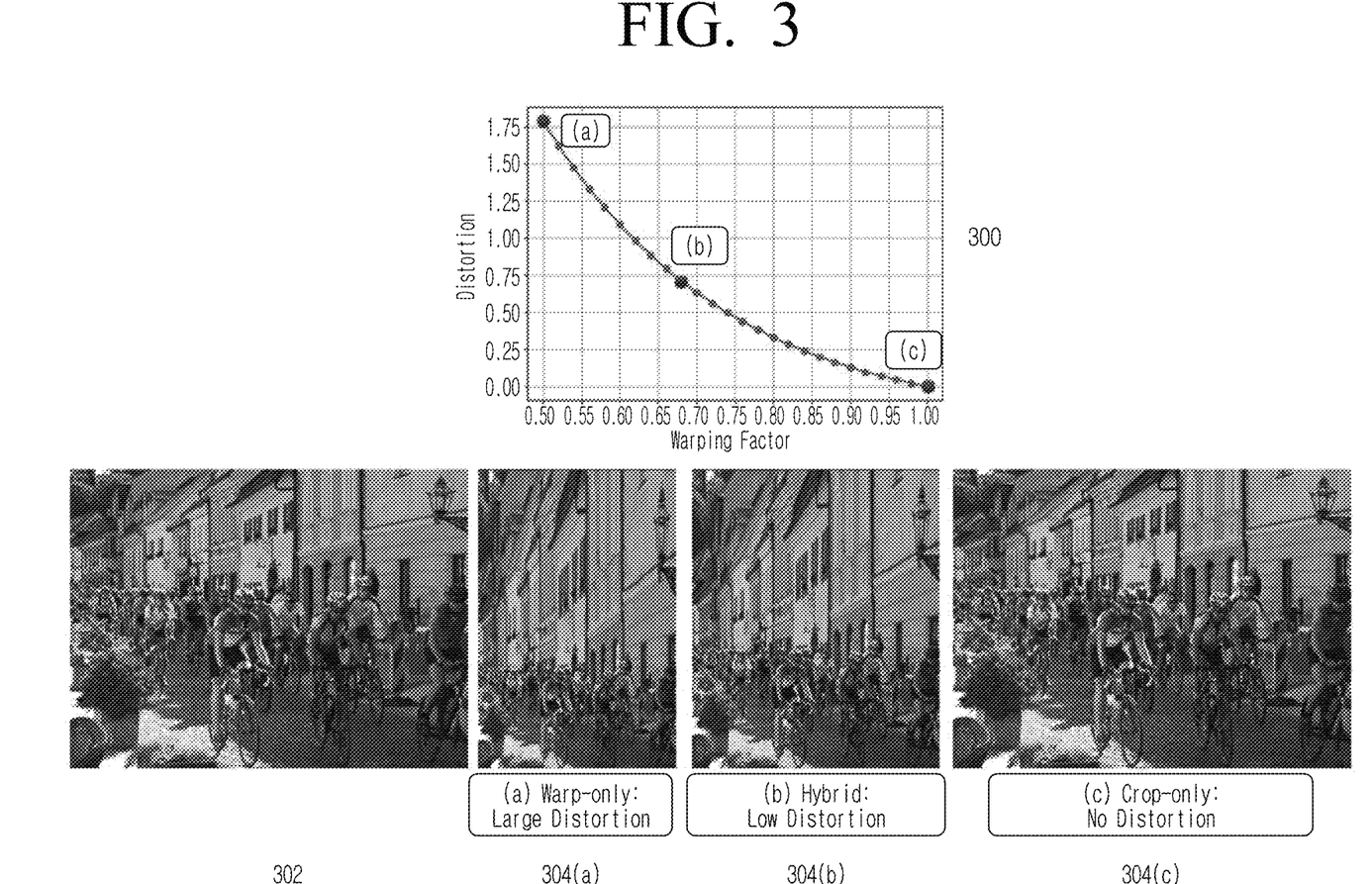
FIG. 3 is a diagram that illustrates an example that retargets a source image, according to an embodiment.

FIG. 3 is a diagram that illustrates an example that retargets a source image, according to an embodiment. In some embodiments, the optimizer may receive the 2D importance map, the target size $S_{tar}$ and the distortion threshold $D_t$ as inputs and output a warping mesh of size $S_{int}$. FIG. 3 includes a graph 300 that schematically illustrates an example that aims to retarget the source image. The x-axis of the graph represents the warping factor (proportional reduction in the original width of the source image to $S_{tar}=0.5$ in the example), and the y-axis represents the distortion metric. To illustrate how the system may produce a warping mesh with advantageous results, reference is made to points (a), (b) and (c) on the graph 300:

(a) Warping to 0.5 achieves the desired result, but introduces severe distortions (1.75 distortion metric);
(b) Warping to an intermediate size $S_{int}=0.62$ introduces less distortion than (a), but does not achieve the desired

TABLE 1

| Output type | Core technology for implementation | On-device execution time | Model size | Notes |
| --- | --- | --- | --- | --- |
| Semantic Segmentation | DeepLabv3 https://arxiv.org/abs/1706.05587v3 | 20 ms | 2.7 MB | Already highly optimized |
| Semantic Segmentation | DeepLabv3+ https://arxiv.org/abs/1802.02611 | 600 ms | 8.1 MB | May be further improved for time and model size |
| Saliency Detection | MSI-Net https://www.sciencedirect.com/science/article/pii/S0893608020301660 | 2400 ms | 96 MB | May be further improved for time and model size |

In operation 206, the system may produce a warping mesh. In some examples, this mesh is an intermediate (or preliminary) warping mesh that will be superseded by a further or cropped warping mesh that is used to generate the final retargeted image, as described below.

target size (although this can then be done by cropping in a later step as described below);
(c) If no warping is done at all (so as to fully rely on cropping to achieve the target size), then no distortions are introduced, but this "intermediate" image (identical to the source) is further in size from target than (b), and consequently the cropping will be more severe.

The source image is shown at 302, whilst images 304(a), 304(b) and 304(c) show the images that would be produced by applying the warping meshes generated at points (a), (b) and (c), respectively, of the graph 300. Images 304(b) and (c) show the sample retargeted images with decreasing distortions on the background buildings. FIG. 3 illustrates the trade-off between distortions and content preservation. As the retargeting factor is changed from 1 (i.e., an unwarped image, with distortion equal zero) to 0.5, the distortion increases monotonically. D, may be used to tune images from warping-only to cropping-only, as well as different degrees of hybrid warping-cropping. 304(a) shows warp-only retargeting, which preserves all of the original content but has severe distortions in the background houses. 304(b) shows an image with a good balance between warp and crop, which preserves most of the important content while keeping distortions low.

The optimizer may be in charge of producing the optimal intermediate warp, such as that which produces the image 304(b) in the example. In some embodiments, the optimizer can produce an intermediate mesh by finding the root $S_{int}$ of the following function:

$$D(S)-D_t=0$$

For example, a bisection algorithm may be used to find $S_{int}$ given $D_t$. Alternatively, a simple linear search could be performed, or a more complex search based on function gradient approximations. $D_t$ may be tuned by a developer or user.

The distortion function D(S) may be a function of the warping size S. D is a function of the warping mesh, and the warping mesh is a function of S (i.e., D(Mesh(S))). The warping mesh may be defined by a set of $N_C$ parameters. The parameters that define the mesh may be, for example, a set of vertex coordinates and edges (i.e., $X_{mesh}=\{x_1, x_2, \ldots, x_{N_C}\}$). Given a mesh size S, the mesh parameters may be obtained using a variety of optimization algorithms.

In one example embodiment, the warping mesh may be obtained given a mesh size. The parameters that define the warping mesh may be defined by a set of heights and widths: $h_i$ and $w_i$. With X being a vector whose elements include the heights and widths, $X^T=(h_1, h_2, \ldots, h_M, w_1, w_2, \ldots, w_P)$. Given an arbitrary mesh size S, the mesh parameters X may be found via a minimization process that minimizes $X^T Q X + X^T b$ respect to X subject to the following constraints:

$$\sum_{i=1}^{M} h_i = S_H,$$

$$h_i \geq 0,$$

$$\sum_{i=1}^{P} w_i = S_W,$$

$$w_i \geq 0.$$

where $S=(S_H, S_W)$, and $S_H$ and $S_W$ are the target height and width, and Q and b are a matrix and vector that depend on the 2D importance map.

There are multiple methods that may be used to obtain the distortion D from the mesh. In some embodiments, the warping mesh is obtained at the step 206 using the AAD process. The system may use an iterative algorithm which finds the optimal warping that AAD (or another suitable algorithm) may produce. For instance, the optimal warp may be defined as the AAD warp that, when applied to the source image, would produce an image that is as close to the target size as possible, but which does not introduce excessive noticeable distortions (i.e. does not exceed the distortion threshold $D_t$). To this end, the system may use a metric to quantify noticeable distortion.

The distortion metric should be sensitive to changes in aspect ratio of large cells of the mesh, as those will be more noticeable than changes in small cells. The system may use a metric that measures the average change in aspect ratio of cells across the image, weighted by the area and importance of each cell as given by the importance map. Some embodiments use the following formula to capture the distortion metric D:

$$D = \frac{1}{A} \sum_{i=1}^{N} \left[ \frac{\max(h_i', w_i')}{\min(h_i', w_i')} - 1 \right] \cdot h_i \cdot w_i \cdot (\Omega_i + \Omega_0).$$

where:
A is the total area of the warped image;
$h_i'$ and $w_i'$ are the normalized height and width, i.e., $h_i'=h_i/h_0$ and $w_i'=w_i/w_0$, where $h_0$ and $w_0$ are the height and width of cells in the uniform mesh (i.e., the source height and width divided by number of rows M and columns P of the mesh);
N is the number of cells in the mesh;
$\Omega_i$ is the average importance over pixels of the ith cell, and
$\Omega_0$ is a tunable parameter to penalize the distortion of non-important cells (this may be determined by testing).

In some embodiments, the testing used was subjective tuning over a small dataset (~20 images) with a small number of users (~4). Alternatively, an automated process could be used, for example, using a DNN to estimate visual quality and provide feedback on the tuning of this parameter.

The term in square brackets above captures the departure of a cell from its original aspect ratio. D is not the same as energy E used in the AAD optimization problem. E is a quadratic on the coordinates, and assigns zero weight to unimportant cells, whereas D is linear on the coordinates and assigns non-zero value to the unimportant cells. D may be a more consistent quantity over E, with values on the same scale for images with a variety of importance maps, which is a feature for a metric used in embodiments of the method disclosed herein. One of skill in the art will understand that mathematical equivalents/variants of the above formula, or different representations of the calculation, may be used in alternative embodiments.

Given a target size and an importance map, the system may find the maximum warping that may be applied to an image while keeping D<Dt, where Dt is the tunable parameter/distortion threshold. This may be achieved by finding the root of the function $f(D)=D-Dt$. Solving this equation may be utilized if the distortion D produced by a warp of the target size is larger than the Dt. Otherwise, warping the image to the target size is considered not to introduce severe distortions (illustrated by the "Yes" branch from step 208 in the pipeline of FIG. 2).

In some embodiments, the system may, particularly ones implemented on devices where the aspect ratio changes dynamically, such as foldable phones or similar devices, use an aspect ratio detector (e.g., implemented as a software module in an operating system) in the generation of the warping mesh in operation 206. This may be provided by the system on a configuration change event. In such embodiments, the source image and the 2D importance map may be the same and are stored in memory. For example, when a foldable device is changed from folded to unfolded, or from unfolded to folded, the following steps may be performed:

1. The Aspect Ratio Detector detects the change.
2. The currently active display changes.
3. The retargeting pipeline/method is executed starting from operation 204 to the rendering operation 214.

There is no need to account for any pixels cropped in a previous resize because the new image will be generated using pixels from the source image stored in memory, which is intact and therefore has all of the original pixels.

The system may allow users to switch back and forth from device folding status, so that the image may automatically be displayed correctly.

In operation 208, the system may determine whether the size of the warping mesh corresponds to the target size. In other words, the system may determine whether the intermediate mesh have the size of the desired target image (i.e., $S_{int}=S_{tar}$). In some embodiments, the sizes will be determined to correspond if they are exactly equal, although other embodiments may allow a small (e.g., 1%-2%) tolerance. If the sizes do correspond, then the system proceeds to operation 214, where the retargeted image 215 is produced by applying the warping mesh that was generated in operation 206 to the source image (e.g., using a rendering process such as OpenGL Renderer) and the process ends. However, if the sizes do not correspond, then content-aware cropping (operations 210-212) is applied before rendering.

Figure 4:
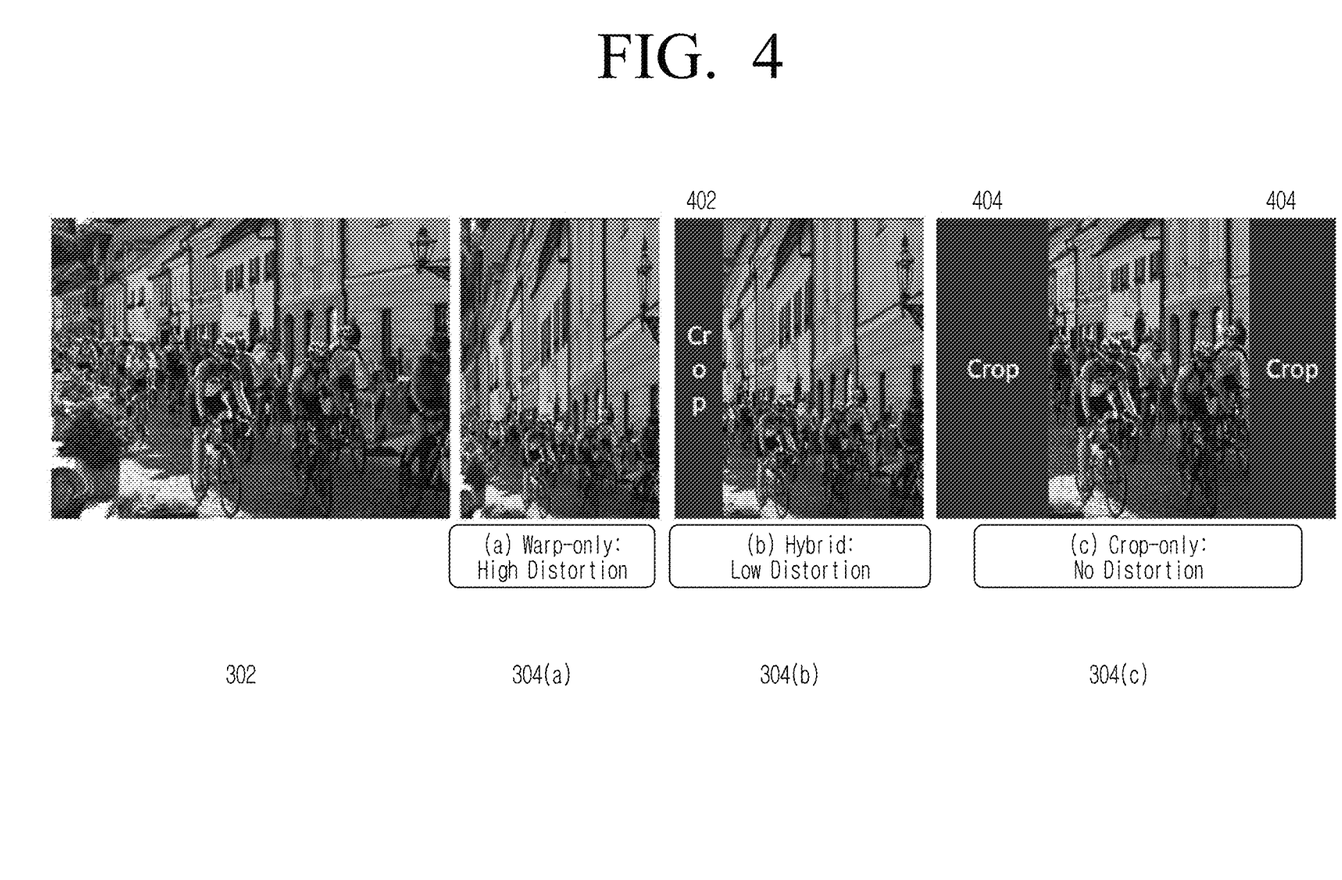
FIG. 4 is a diagram including versions of the images of FIG. 3 with content-aware cropping applied according to an embodiment.

FIG. 4 is a diagram including versions of the images of FIG. 3 with content-aware cropping applied according to an embodiment. In particular, FIG. 4 shows versions of the images 304(a)-304(c) of FIG. 3 with content-aware cropping applied according to an embodiment in order to illustrate how the process can operate. The desired target size of 0.5 may be achieved by cropping the partially warped image:

(a) Image 304(a) remains unchanged, no cropping is needed as warping alone achieves the target size;
(b) Cropping a small region 402 on the left is enough. The final retargeted image is less distorted than warping-only image 304(a) and preserves more content than cropping-only image 304(c);
(c) More cropping regions 404 on both sides of the image than in image 304(b) are needed as the image was not previously warped. No deformations are introduced, but cyclists on the left and right are lost compared to 304(b).

In some embodiments, the content-aware cropping may be distributed to the left and right of the intermediately warped image, aiming to minimize removal of important regions. This may be achieved by computing a one-dimensional version of the importance map, and distributing the cropping in such a way as to minimize the area under the curve that is removed (e.g., the one-dimensional map). Additionally or alternatively, the content-aware cropping may be distributed to the top and bottom of the intermediately warped image. For efficiently, the actual cropping is implemented via a final warping mesh, which effectively merges into one operation both the intermediate warping and the cropping.

In operation 210, the system may produce a 1D version of the 2D importance map that was generated in operation 204 as part of the content-aware cropping process. This may be done by computing the average of pixel values over each column of pixels in the 2D importance map to produce a 1D source importance map. 1D warping may then be applied to this 1D source importance map in order to produce a warped importance map. This may be done by using one axis (e.g., the one matching the one calculated for the 1D importance map) of the 2D warping mesh to warp the 1D importance map to the target dimensions. This is possible because the deformations are axis-aligned. The system may then identify optimal cropping regions as those that will minimize removal of important regions in the 1D warped importance map.

Instead of warping the 2D importance map using the warping mesh and then computing a 1D version of the warped importance map, the system may perform a more efficient process of first computing a 1D version of the 2D importance map and then applying a 1D warp to it. The system may produce a 1D importance map by computing the average of pixel values over each column of pixels in 2D importance map (e.g., generated in operation 204) to produce a 1D source importance map and then applying 1D warping to this 1D source importance map to produce a warped 1D importance map. The system may then determine optimal cropping regions as those that will minimize removal of important regions in the 1D warped importance map.

Figure 5A:
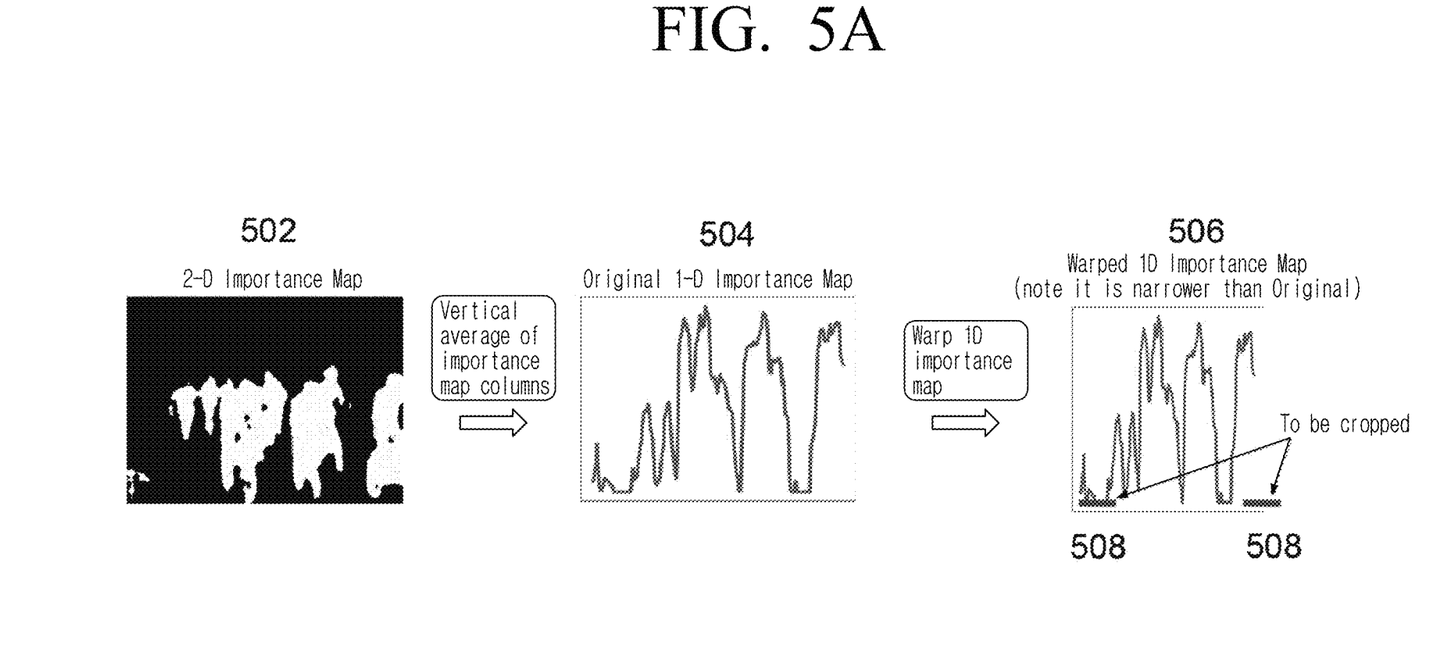
FIGS. 5A and 5B are diagrams of examples of warp-cropping using a one-dimensional (1D) importance map to reduce the width and height, respectively, of a source image according to an embodiment.
Figure 5B:
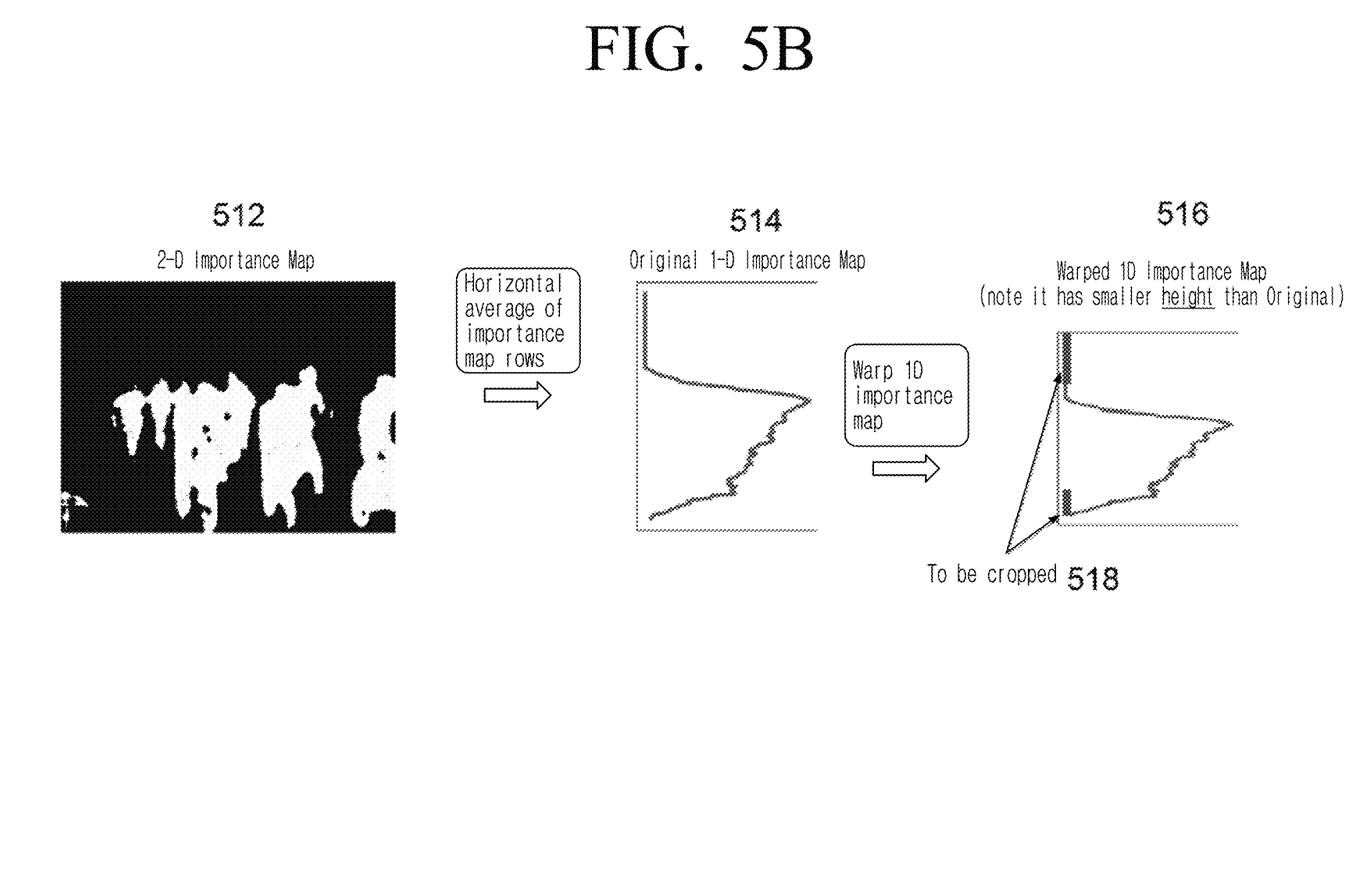

FIGS. 5A and 5B are diagrams of examples of warp-cropping using a 1D importance map to reduce the width and height, respectively, of a source image according to an embodiment. FIG. 5A illustrates an example of warp-cropping using a 1D importance map in order to reduce the width of the source image. 502 shows the 2D importance map (e.g., generated in operation 204). The process can then take the vertical average of the columns of the 2D importance map to produce the 1D importance map, illustrated graphically at 504. The process can then apply 1D warping to the 1D importance map in order to produce the warped importance map illustrated graphically at 506 (which has reduced width compared to the original). Areas 508 at the left and right edges of the image will be cropped.

FIG. 5B illustrates an example of warp-cropping using a 1D importance map in order to reduce the height of the source image. The system may choose the dimension (e.g., width and/or height) to be retargeted given the target image size. For instance, a uniform scaling may be applied to the image to make one of the dimensions match the target size but the other dimension will still be too large. This "too large" dimension will be the one to which retargeting is applied. Once this dimension has been selected, the subsequent operations, including the cropping, may operate along this dimension. 512 shows the 2D importance map (e.g., generated in operation 204). The process may then take the horizontal average of the rows of the 2D importance map to produce a 1D importance map, illustrated graphically at 514. The process may then apply 1D warping to the 1D importance map in order to produce the warped importance map illustrated graphically at 516 (which has reduced height compared to the original). Areas 518 at the top and bottom edges of the image will be cropped.

Figure 6:
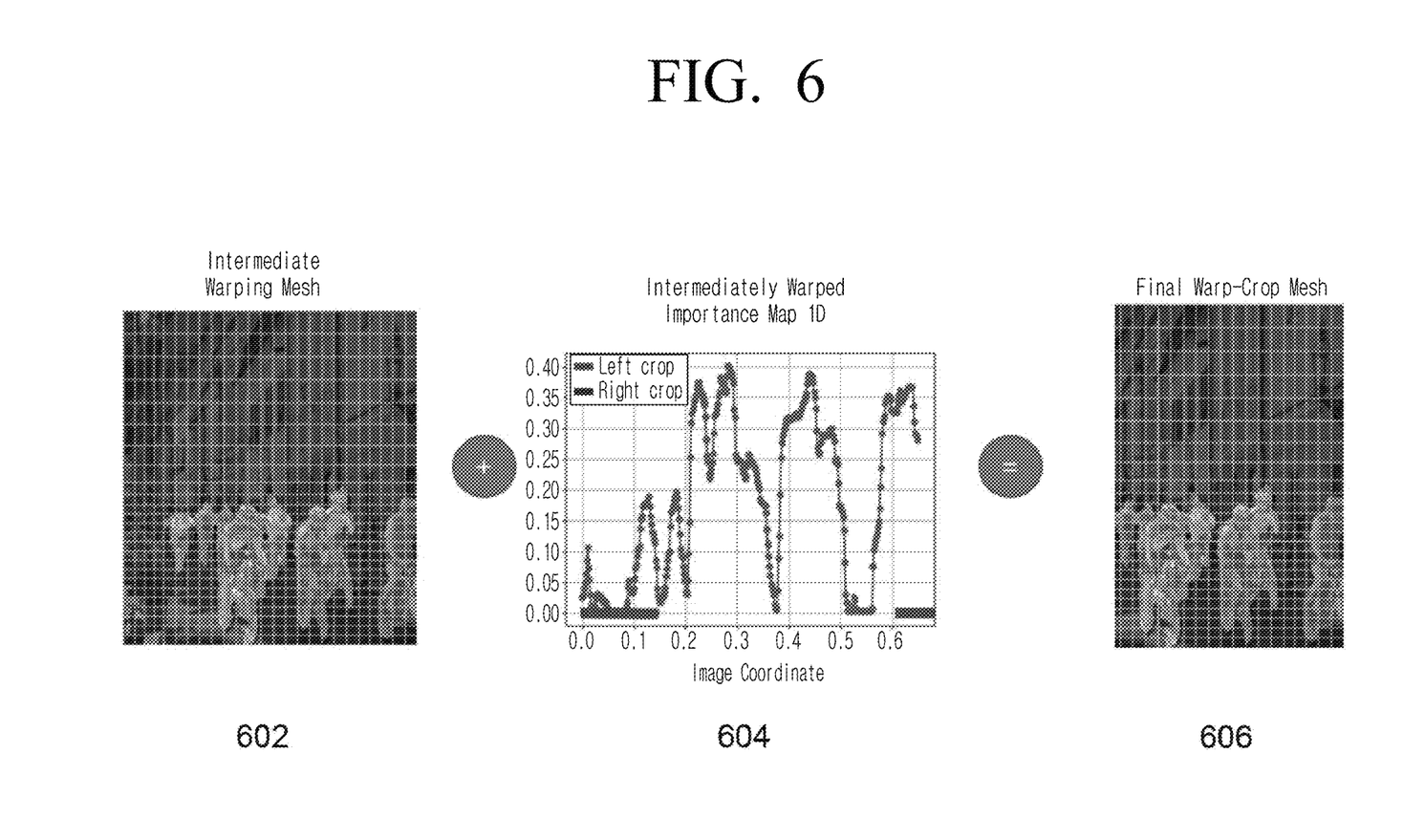
FIG. 6 is a diagram of an example of the result of warping an intermediate warping mesh using a warped 1D importance map according to an embodiment.

FIG. 6 is a diagram of an example of the result of warping an intermediate warping mesh using a warped 1D importance map according to an embodiment. For efficiency, cropping may effectively be encoded in the warping mesh. This allows the warping and cropping of the final image to be done in a single step. FIG. 6 schematically illustrates an example of the result of warping the intermediate warping mesh 602 (e.g., generated in operation 206) using the warped 1D importance map 604 (e.g., generated in operation 210) to produce the cropped warping mesh 606 (e.g., generated in operation 212).

The sample code below in Table 2 below is an example of the 1D importance map generation for the specific case of vertical averaging (used to reduce image width). The case of horizontal averaging of rows (used to reduce image height) is analogous, swapping x and y variables and swapping height and width variables.

TABLE 2

Sample Code

```
void updateSaliencyWmap(StateData * sd){
    if((sd     !=     nullptr)    &&    (sd->imageWidth     <=
StateData::SALIENCY_WMAP_MAX_SIZE)) {
        // for each vertical column
        for(int x=0; x<sd->imageWidth; x++) {
            // calculate normalized sum of saliency data in 0.. 1 range
            int height = sd->imageHeight;
            double sum = 0;
            for(int y=0; y<height; y++) {
                // sum normalized values
                sum += getSaliency(x,y)/255.0;
            }
            // normalize to column height
            sum /= height;
            sd->saliencyWmap[x] = sum;
        }
    }
}
```

In some embodiments, a synthetic importance may be added to the 1D importance map. This synthetic importance may bias the cropping towards a preferred section of the image. Examples of synthetic importance may be obtained via pyramid like functions that start at zero at an edge of the image, and linearly increase towards a pre-defined point in the image, and may then fall to zero towards the opposite edge. The pre-defined point may include, for example, the image center, a distance of about ⅔ of the total width from one of the edges (so as to follow the photography rule of thirds) or the center of mass of the importance map.

Figure 7:
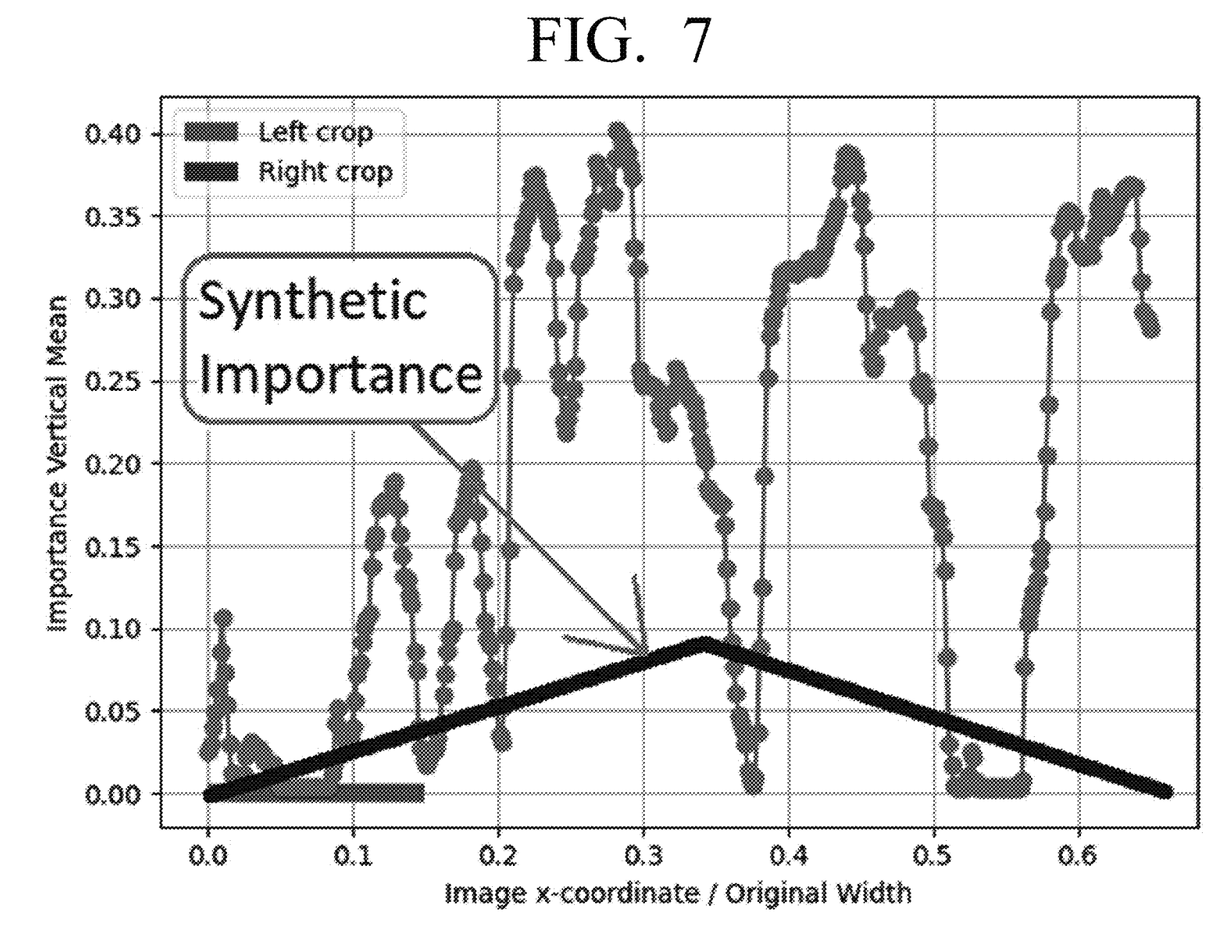
FIG. 7 is a diagram of a pyramid-like function applied to the warped 1D importance map of FIG. 6 according to an embodiment.

FIG. 7 is a diagram of a pyramid-like function applied to the warped 1D importance map of FIG. 6 according to an embodiment. The example of FIG. 7 graphically shows how such a pyramid-like function, which reaches a peak near the center of the image, may be applied to the warped 1D importance map 604 of FIG. 6. In practice, this would mean that areas at the edges of the image are more likely to be cropped that its central area. Such the system may address the technical problem of how to produce a more aesthetically pleasant retargeted image. Parts of the description above explain the method in detail for the case of width/height reduction, but the skilled person will appreciate that analogous techniques may be used for increasing width/height.

After the 1D importance map has been finalized and the cropping regions have been determined, the system may generate a cropped warping mesh that incorporates both the intermediate warping mesh produced in operation 206 and the content-aware cropping determined in operations 210 and 212. This may be done by taking the intermediate warped mesh produced in operation 206 and applying cropping to it, effectively reducing the size of the cropped mesh cells to zero. Such the system may provide the technical advantage of efficiently and simultaneously performing both warping and cropping. In operation 214 that cropped warping mesh is applied to the source image to render the retargeted image 215.

Table 3 below shows reported retargeting execution times on a desktop computer for different methods, including the embodiment described above. This is for illustrative purposes only, as hardware differences are not accounted for, but does show the timing advantage of the embodiment:

TABLE 3

| Method | Time (ms) | Image size | Hardware Used |
| --- | --- | --- | --- |
| Nobukatsu Kajiura, Satoshi Kosugi, Xueting Wang, and Toshihiko Yamasaki, "Self-play reinforcement learning for fast image retargeting," in *Proceedings of the 28th ACM International Conference on Multimedia*, New York, NY, USA, 2020, MM '20, p. 1755-1763, Association for Computing Machinery | 9900 | 640 × 480 | CPU Intel Xeon Gold 6136, 3.00 GHz |
| W. Tan, B. Yan, C. Lin, and X. Niu, "Cycle-ir: Deep cyclic image retargeting," *IEEE Transactions on Multi-media (TMM'2019)*, pp. 1-1, 2019 | 370 | 1024 × 768 | GPU NVIDIA Quadro M4000 |
| Moab Arar, Dov Danon, D. Cohen-Or, and Ariel Shamir, "Image resizing by reconstruction from deep features," *ArXiv*, vol. abs/1904.08475, 2019 | 120000 | 640 × 480 | — |
| Donghyeon Cho, Jinsun Park, Tae-Hyun Oh, Yu-Wing Tai, and So In Kweon, "Weakly- and self-supervised learning for content-aware deep image retargeting," *ICCV*, pp. 4568-4577, 2017 | 1000 | 224 × 224 | GPU NVIDIA GTX 1080 |
| C. P. Lau, C. P. Yung, and L. M. Lui, "Image retarget-ing via beltrami representation," *IEEE Transactions on Image Processing*, vol. 27, no. 12, pp. 5787-5801, 2018 | 1000 | 615 × 461 | CPU Intel Core i7, 3.4 GHz |

TABLE 3-continued

| Method | Time (ms) | Image size | Hardware Used |
|---|---|---|---|
| Mahdi Ahmadi, Nader Karimi, and Shadrokh Samavi, "Context-aware saliency detection for image retargeting using convolutional neural networks," 2019 | 15320 | 1024 × 813 | GPU NVIDIA GTX 1080 |
| Embodiment | 120 | 2152 × 813 | GPU NVIDIA GeForce RTX 2080, and a CPU Intel i9-9820X |

Table 4 below provides example timings from an embodiment executed on a Samsung Galaxy Fold™ (F900U):

TABLE 4

| Step | Algorithm/technology used | Execution time (ms) |
|---|---|---|
| Importance map generation (204) | DeepLab3v+ (https://arxiv.org/abs/1802.02611) MSI-Net (https://www.sciencedirect.com/science/article/pii/S0893608020301660) | <=3000 |
| Warping mesh generation (206) | AAD (https://igl.ethz.ch/projects/retargeting/aa-retargeting/) and distortion metric calculation disclosed herein | 100 |
| Hybrid Warp-Cropping mesh (210-212) | As disclosed herein | 20 |
| Rendering of retargeted image (214) | GL Renderer | 10 |

In the experiment, execution took 3130 ms, of which approximately 3000 corresponded to importance map generation. As the importance map generation is done only once per source image, independently of the target size, it can be done in pre-processing. Once the importance map is produced, retargeting to any target size can be done in around 130 ms, allowing real-time interactive use.

Examples have been tested both on desktop and on mobile devices, and a user study based on the RetargetMe benchmark (see Michael Rubinstein, Diego Gutierrez, Olga Sorkine, and Ariel Shamir, "A comparative study of image retargeting", *ACM Transactions on Graphics (Proceedings of ACM SIGGRAPH ASIA)*, vol. 29, no. 5, pp. 160:1-160:10, 2010) shows that examples can perform at the state-of-the-art level, while executing in a fraction of the time of recent DNN-based methods, as illustrated by the results in Table 5 below. Table 5 shows the normalized number of votes in the RetargetMe user study (note that, apart from Beltrami, which uses hand-crafted importance maps, all methods are fully automatic):

TABLE 5

| Method | Normalized Votes |
|---|---|
| Scale | 0.75 |
| Beltrami | 0.95 |
| CycleIR | 0.84 |
| AAD | 0.83 |
| Embodiment | 1.00 |

The system may provide a user interface that allows a user to load an image from a gallery and dynamically/selectively adjust its width. The system may retarget a source image used as a background to a new size, and may rearrange icons to match wallpaper scenario. It will be understood that further operations may be performed, such as resizing the icons according to particular parameters (e.g. icons representing closer friends being larger in size than more distance acquaintances).

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

What is claimed is:

1. A method of image retargeting, the method comprising:
obtaining a source image;
obtaining a target size for a retargeted image based on the source image;
generating a two-dimensional importance map for the source image;
generating, based on the two-dimensional importance map and the target size, a warping mesh having a distortion metric below a threshold value;
determining whether a size of the warping mesh corresponds to the target size;
based on the size of the warping mesh being determined to correspond to the target size, rendering the retargeted image by applying the warping mesh to the source image, and
based on the size of the warping mesh being determined to not correspond to the target size:
generating, based on the warping mesh, a cropped warping mesh comprising at least one cropped region based on a one-dimensional version of the two-dimensional importance map, and
applying the cropped warping mesh to the source image to render the retargeted image.

2. The method of claim 1, wherein the distortion metric comprises a measure of an average change in an aspect ratio of a plurality of cells of the warping mesh across the source image weighted by a size and importance of each of the plurality of cells.

3. The method of claim 2, wherein the threshold value comprises a tunable parameter $D_t$ that regulates proportions of warping and cropping of the warping mesh.

4. The method of claim 1, wherein the warping mesh is generated such that a height and/or a width of the source image is warped to a maximum value with the distortion metric below the threshold value.

5. The method of claim 4, further comprising using an iterative process to determine the maximum value using the distortion metric D by finding a root $S_{int}$ of a function of:

$$D(S_{int}) - D_t = 0,$$

wherein the distortion metric D is determined according to:

$$D = \frac{1}{A}\sum_{i=1}^{N}\left[\frac{\max(h_i', w_i')}{\min(h_i', w_i')} - 1\right] \cdot h_i \cdot w_i \cdot (\Omega_i + \Omega_0).$$

wherein
A is a total area of the warping mesh;
$h_i$ and $w_i$ are a non-normalized height and width, respectively, of cells in the warping mesh;
$h_i'$ and $w_i'$ are a normalized height and width, respectively, of cells in the warping mesh;
N is a number of cells in the warping mesh;
$\Omega_i$ is an average importance over pixels of an $i^{th}$ cell of the warping mesh, and
$\Omega_0$ is a tunable parameter to penalize distortion of non-important cells in the warping mesh.

6. The method of claim 1, wherein the cropped warping mesh is generated by distributing cropping to left and/or right side edges, and/or top and/or bottom edges, of the warping mesh to reduce removal of important regions of the source image.

7. The method of claim 6, wherein generating the cropped warping mesh further comprises:
determining at least one region to crop based on the one-dimensional version of the two-dimensional importance map;
producing a warped one-dimensional warping mesh by:
applying one-dimensional warping to the one-dimensional version of the two-dimensional importance map, and
cropping the determined at least one region from the one-dimensional version of the two-dimensional importance map, and
generating the cropped warping mesh based on the warped one-dimensional warping mesh.

8. The method of claim 7, further comprising adding importance factors to the one-dimensional version of the two-dimensional importance map to bias the cropping towards specific regions.

9. The method of claim 8, wherein the importance factors are based on a function set to near zero at side and/or top/bottom edges of the two-dimensional importance map,
wherein the function increases towards a pre-defined section of the source image, and
wherein the pre-defined section of the source image is selected from a set comprising: an image center; a distance of about two-thirds of a total width of the source image; and a center of mass of the two-dimensional importance map.

10. The method of claim 1, further comprising detecting a configuration change event to initiate the generating of the two-dimensional importance map for the source image.

11. The method of claim 1, wherein the two-dimensional importance map is generated using deep neural network (DNN)-based semantic segmentation and saliency detection.

12. The method of claim 1, further comprising generating the two-dimensional importance map as a pre-processing step independently of the step of obtaining the target size.

13. The method of claim 1, wherein the source image comprises a background on a display of a mobile device.

14. A device for image retargeting, the device comprising:
a memory storing instructions, and
a processor configured to execute the instructions to:
obtain a source image;
obtain a target size for a retargeted image based on the source image;
generate a two-dimensional importance map for the source image;
generate, based on the two-dimensional importance map and the target size, a warping mesh having a distortion metric below a threshold value;
determine whether a size of the warping mesh corresponds to the target size;
based on the size of the warping mesh being determined to correspond to the target size, render the retargeted image by applying the warping mesh to the source image, and
based on the size of the warping mesh being determined to not correspond to the target size:
generate, based on the warping mesh, a cropped warping mesh comprising at least one cropped region based on a one-dimensional version of the two-dimensional importance map, and
apply the cropped warping mesh to the source image to render the retargeted image.

15. A non-transitory, computer-readable medium connected with one or more processors and configured to store instructions that, when executed by the one or more processors, cause the one or more processors to:

obtain a source image;
obtain a target size for a retargeted image based on the source image;
generate a two-dimensional importance map for the source image;
generate, based on the two-dimensional importance map and the target size, a warping mesh having a distortion metric below a threshold value;
determine whether a size of the warping mesh corresponds to the target size;
based on the size of the warping mesh being determined to correspond to the target size, render the retargeted image by applying the warping mesh to the source image, and
based on the size of the warping mesh being determined to not correspond to the target size:
   generate, based on the warping mesh, a cropped warping mesh comprising at least one cropped region based on a one-dimensional version of the two-dimensional importance map, and
   apply the cropped warping mesh to the source image to render the retargeted image.

\* \* \* \* \*